US010693295B2

(12) United States Patent
Tuleja

(10) Patent No.: US 10,693,295 B2
(45) Date of Patent: Jun. 23, 2020

(54) RESIDENTIAL ELECTRIC LOAD SHIFTING ENERGY STORAGE SYSTEM

(71) Applicant: Alternate Power Source, Inc., Mansfield, MA (US)

(72) Inventor: Stephen M. Tuleja, Mansfield, MA (US)

(73) Assignee: Alternate Power Source, Inc., Mansfield, MA (US)

( * ) Notice: Subject to any disclaimer, the term of this patent is extended or adjusted under 35 U.S.C. 154(b) by 237 days.

(21) Appl. No.: 14/811,010

(22) Filed: Jul. 28, 2015

(65) Prior Publication Data

US 2016/0034011 A1 Feb. 4, 2016

Related U.S. Application Data

(60) Provisional application No. 62/103,266, filed on Jan. 14, 2015, provisional application No. 62/031,374, filed on Jul. 31, 2014.

(51) Int. Cl.
*H02J 3/14* (2006.01)
*G05B 15/02* (2006.01)
(Continued)

(52) U.S. Cl.
CPC ............ *H02J 3/14* (2013.01); *G05B 15/02* (2013.01); *H02J 3/32* (2013.01);
(Continued)

(58) Field of Classification Search
CPC . G06F 1/263; G05B 15/02; G05B 2219/2642; G05B 2219/2639;
(Continued)

(56) References Cited

U.S. PATENT DOCUMENTS 8,560,138 B2 * 10/2013 Iwamura ............... H04B 3/54
307/31
9,026,260 B1 * 5/2015 Thornley .............. H02J 3/00
700/292
(Continued)

OTHER PUBLICATIONS

Holt, Mike. Emergency Systems and the NEC [Online], [Retrieved Dec. 1, 2019], Retrieved from the internet <URL: https://www.emweb.com/code-basics/emergency-systems-and-nec>,dated May 15, 2103 (Year: 2013).*

*Primary Examiner* — Robert E Fennema
*Assistant Examiner* — Shon G Foley
(74) *Attorney, Agent, or Firm* — Wolf, Greenfield & Sacks, P.C.

(57) ABSTRACT

Techniques are provided for shifting residential electric load from a utility power grid to a battery system during preconfigured hours of electric use. The apparatus includes a memory configured to store computer executable instructions, and a microprocessor in communication with the memory, the microprocessor configured to execute the instructions to cause the apparatus to shift residential electric load from the utility power grid to the battery system for a first time period during a first calendar period of a calendar year, and to shift residential electric load from the utility power grid to the battery system for a second time period during a second calendar period of the calendar year.

17 Claims, 7 Drawing Sheets

(51) Int. Cl.
*H02J 3/32* (2006.01)
*H02J 9/04* (2006.01)

(52) U.S. Cl.
CPC .............. *G05B 2219/2639* (2013.01); *G05B 2219/2642* (2013.01); *H02J 9/04* (2013.01); *Y02B 70/3225* (2013.01); *Y02B 70/3241* (2013.01); *Y04S 20/222* (2013.01); *Y04S 20/227* (2013.01)

(58) Field of Classification Search
CPC . Y04S 20/227; Y04S 20/222; Y02B 70/3241; Y02B 70/3225; H02J 3/14; H02J 3/32; G05F 1/66
USPC .................. 700/291, 295–297; 320/133, 155
See application file for complete search history.

(56) References Cited

U.S. PATENT DOCUMENTS

| | | | |
|---|---|---|---|
| 2003/0085626 A1* | 5/2003 | Odaohhara | G06F 1/263 307/150 |
| 2006/0276938 A1* | 12/2006 | Miller | G06Q 50/06 700/295 |
| 2007/0221205 A1* | 9/2007 | Landon | F23B 50/12 126/502 |
| 2010/0023786 A1* | 1/2010 | Liberman | H02J 3/14 713/320 |
| 2010/0280677 A1* | 11/2010 | Budike, Jr. | H05B 37/0272 700/296 |
| 2012/0130556 A1* | 5/2012 | Marhoefer | H02J 3/32 700/291 |
| 2012/0232714 A1* | 9/2012 | Ricket | G06F 1/26 700/297 |
| 2012/0235473 A1* | 9/2012 | Jiang | H01M 2/1072 307/9.1 |
| 2012/0262093 A1* | 10/2012 | Recker | H05B 33/0854 315/308 |
| 2012/0271475 A1* | 10/2012 | Wang | H02J 3/14 700/295 |
| 2013/0103222 A1* | 4/2013 | Watson | G06Q 50/06 700/295 |
| 2013/0249289 A1* | 9/2013 | Patel | H02J 3/28 307/26 |
| 2014/0290905 A1* | 10/2014 | Heintz | F24F 11/008 165/63 |

\* cited by examiner

RESIDENTIAL ELECTRIC LOAD SHIFTING ENERGY STORAGE SYSTEM

RELATED APPLICATIONS

This application relates to and claims priority under 35 U.S.C. §119(e) to U.S. Provisional Patent Application Nos. 62/031,374, titled "RESIDENTIAL COMBINED HEAT AND POWER SYSTEM WITH ELECTRIC LOAD SHIFTING CAPABILITIES," which was filed on Jul. 31, 2014, and 62/103,266, titled "RESIDENTIAL ELECTRIC LOAD SHIFTING ENERGY STORAGE SYSTEM WITH COMBINED HEAT AND POWER SYSTEM CAPABILITIES," which was filed on Jan. 14, 2015, both of which are hereby incorporated by reference herein in their entirety.

TECHNICAL FIELD

The disclosed subject matter generally relates to techniques for a residential electric load shifting energy storage system, including a residential electric load shifting energy storage system with a combined heat and power system that uses a tankless hot water heater.

BACKGROUND

Residential electric load represents approximately 39% of the overall United States electric system consumption.

Intermittent residential electric usage often requires power pools to run less efficient power plants at a higher cost to the consumer during peak periods. Peaking power plants typically emit 30% more pollutants than base load power plants.

Current battery technology and energy storage is often more expensive than the cost to run peaking power plants. Current battery technology connected to intermittent residential load through a load shift system can be more cost effective than peaking power plants.

Conventional commercial and residential heating and power systems operate separately from one another and together are only around 51% efficient. A typical commercial natural gas combustion turbine combined heat and power (CHP) system operates at 75% efficiency. However, there are no residential CHP systems in the market.

Commercial and residential heating systems are typically fossil fuel fired and located at the end users property to produce heat for a building. Natural gas utilities and oil companies deliver fossil fuels to the end users at their property to heat their buildings.

Electric power plants are large and centrally located and fueled by fossil fuels, hydro, wind and nuclear materials to generate electric energy. Electric energy is then delivered to end users over a network of transmission and distribution cables by a regulated electric utility company.

Combined heat and power systems provide both heat and electric energy and are located at the end users property. Typically a commercial sized onsite natural gas generator produces electric energy and the waste heat from the onsite generator heats the building.

Thermo electric generators (TEG's) produce electric energy through a differential in temperature using what is known as the Seebeck effect. TEGS's come in many different sizes and are manufactured by many. By applying heat on one side of the TEG and cold on the other side the solid state device produces electric energy. Typical hot side operating temperatures are 270-500 C and cold side is 30 C.

A typical natural gas fired utility scale generator with a heat rate of 8000 BTU/kwh is 42% efficient. However, TEG's are inefficient and are typically only 5-8% efficient. Therefore, TEG's are only being deployed in commercial applications today in remote locations when combustion engine generators are not practical, TEG's are currently not used in residential applications due to inefficiencies and cheaper regulated electric energy rates.

SUMMARY OF THE INVENTION

The techniques described herein provide for a residential electric load shifting (LS) energy storage system and a combined heat and power (CHP) system. In some embodiments, the LS system combines electric relays, microprocessors, batteries and electric meters to supply intermittent residential electric load. The CHP combines one or more TEGs (e.g., a series of 200 watt TEG's, such as those manufactured by Thermonamic Electronics Corp LTD) that are heated with a modified natural gas fired tankless hot water heater. The CHP can be cooled with a hot water coil placed in the hot air return duct of a residential forced hot air heating system, by connecting to the return hot water loop on a forced hot water system, by connecting to a single coil hot water tank, and/or the like.

The disclosed subject matter includes a load shed apparatus for shifting residential electric load from a utility power grid to a battery system during preconfigured hours of electric use. The apparatus includes a memory configured to store computer executable instructions, and a microprocessor in communication with the memory, the microprocessor configured to execute the instructions to cause the apparatus to shift residential electric load from the utility power grid to the battery system for a first time period during a first calendar period of a calendar year, and to shift residential electric load from the utility power grid to the battery system for a second time period during a second calendar period of the calendar year.

In some examples, the first time period, the second time period, the first calendar period, and the second calendar period are defined by a local electric power pool and utility. The first time period can be 1-5 pm and the first calendar period is a summer season, and the second time period is 5-8 pm and the second calendar period is a winter season.

In some examples, the load shed apparatus controls 20 amp relays to switch electric load between the utility power grid and the battery system. The microprocessor can be configured to control the 20 amp relays via a MOSFET. Emergency power can automatically be provided for one or more of a residence heating system, a refrigerator and kitchen lights, for an emergency time period in the event of a loss of utility power. The emergency time period can be 4-8 hours depending on a size of the battery system.

In some examples, electric usage is metered during shed and non-shed operations to generate reporting data. The electric usage can be metered every minute individually for each of three electric circuits, wherein the three electric circuits supply power to a home HVAC system, a home refrigerator and home kitchen lights, and the minute readings can be summed for each of the three individual circuits for each hour to generate hourly reporting data.

In some examples, the battery system is monitored for voltage, heat and hours of operation. Ethernet circuitry can be included to provide Ethernet communication to transmit reporting data to a remote server.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

In the following description, numerous specific details are set forth regarding the systems and methods of the disclosed subject matter and the environment in which such systems and methods may operate, in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments described below are only examples, and that it is contemplated that there are other systems and methods that are within the scope of the disclosed subject matter.

Figure 1:
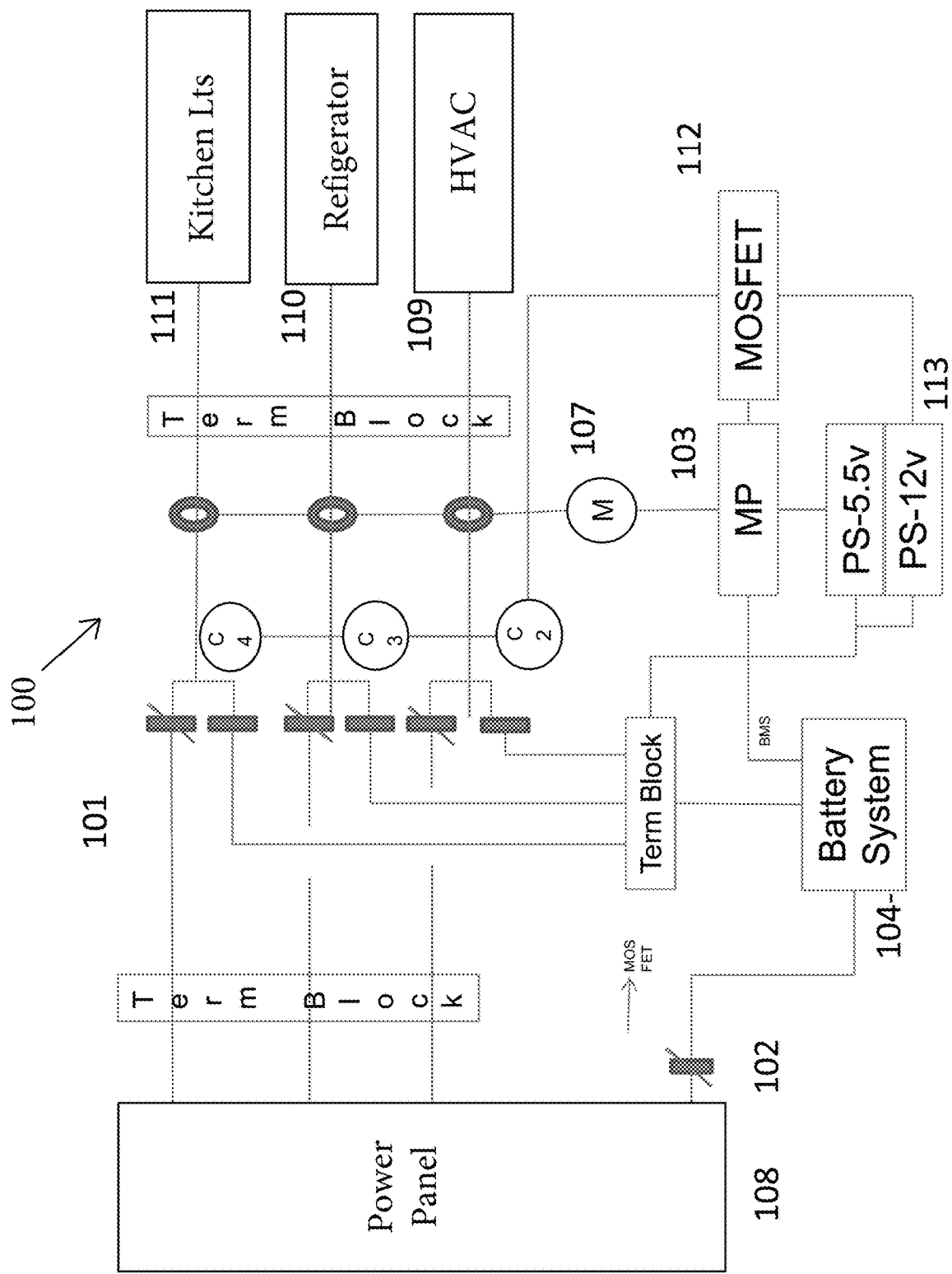
FIG. 1 is an exemplary diagram illustrating load shifting energy storage system for a residential home, in accordance with some embodiments.

FIG. 1 is an exemplary diagram illustrating a residential energy storage and load shift system 100 for use in a residential home, in accordance with some embodiments. System 100 includes a multiple relays 101, a relay 102, a micro-processor 103, a battery system 104 (e.g., which includes a battery charger, a 12 volt battery, a dc/ac inverter), an electric meter and current transformers 107, an existing power panel 108, an existing HVAC system 109, an existing refrigerator 110, existing kitchen lights 111, metal oxide semiconductor field effect transistor (MOSFET) 112 and power supplies 113. The devices 101 through 113 can be connected to the existing electric system of a residential home.

In some embodiments, 101 is a multiple relays to switch between utility and battery power.

In some embodiments, 102 is a relay switch to turn on and shut off the battery charger.

In some embodiments, 103 is a micro-processor capable of switching relay 101 from normal utility power to battery power based upon the local utility and power pool on and off peak power load shedding requirements.

In some embodiments, the battery system 104 includes a battery charger that charges the battery during off peak hours as programmed in the microprocessor. In some embodiments, the battery system 104 includes a battery capable of supply power to HVAC 109, Refrigerator 110 and Kitchen lights 111 during on peak hours as programmed in the microprocessor. In some embodiments, the battery system 104 includes is an dc to ac inverter to convert dc battery power to ac utility power for devices 109, 110 and 111 as programmed in the microprocessor.

In some embodiments, 107 is an electric meter and current transformer capable of recording hourly kilowatt-hours for reporting to the local power pool and utility company.

In some embodiments, 108 is the existing electric power panel in a residential home.

In some embodiments, 109 is the existing HVAC system in a residential home.

In some embodiments, 110 is the existing refrigerator in a residential home.

In some embodiments, 111 is the existing kitchen light in a residential home. The kitchen light bulbs must be replaced with new LED type light bulbs. In an alternative the TV room receptacles can be connected in lieu of the kitchen lights.

In some embodiments, 112 is a metal oxide semiconductor field effect transistor (MOSFET) used to supply power to and energize the relay coils.

In some embodiments, 113 is a power supply to supply power to the micro-processor and MOSFET.

One of skill in the art can appreciate that the system shown in FIG. 1 is illustrative only and not intended to be limiting. Other combinations and arrangements can be contemplated without departing from the spirit of the invention. For example, devices 103, 112, 101, and 113 can be combined on a single printed circuit board to improve cost and size. As another example, while circuits 109, 110 and 111 have been shown for illustrative purposes, any number of circuits can be included (e.g., one circuit, six circuits, and/or the like).

Figure 2:
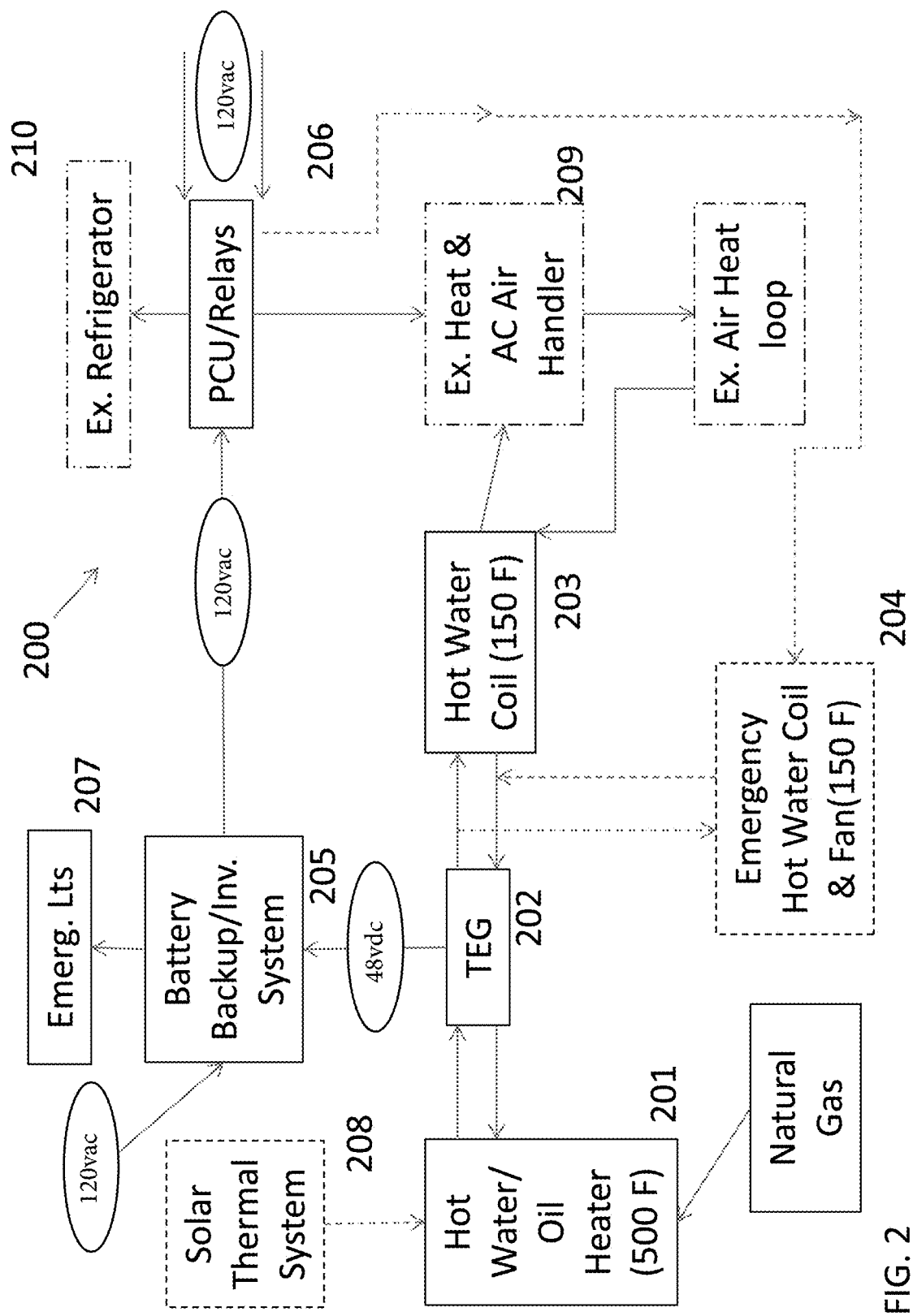
FIG. 2 is an exemplary diagram illustrating a residential combined heat and power system for use in a forced air heating system, in accordance with some embodiments.

FIG. 2 is an exemplary diagram illustrating a residential combined heat and power system 200 for use in a forced air heating system, in accordance with some embodiments. System 200 includes a modified tankless hot water heater 201, a series of 200 watt thermo-electric generators 202, a hot water coil 203, a supplemental hot water coil and fan 204, a backup battery inverter system 205, a microprocessor/relays 206, emergency lights 207 and a supplemental thermal solar system 208. The devices 201 through 208 can be connected to the existing heating ventilating and air condition (HVAC) air handler 209 and refrigerator 210 of a residential home.

In some embodiments, the modified tankless hot water heater 201 is a natural gas tankless hot water heater that is modified to circulate hot oil through a closed loop system in and out of the hot side of the TEG 202 (e.g., a series of 200 watt TEG's at 270 C). The modified tankless hot water heater 201 is modified to accommodate the oil instead of water, is modified to accommodate a 270 C temperature rating, and/or the like. In order to accommodate the TEG's closed loop of hot oil the tankless hot water heater inlet will be connected to the TEG's hot oil outlet and the tankless hot water heaters outlet will be will be connected to the TEG's hot oil inlet. The tankless hot water heater temperature sensors will need to be replaced with 270 C sensors and any component outside the burner box not rated 270 C must be replaced with a device that is rated 270 C. The modified tankless hot water heater 201 can be turned on via a spare contact in the HVACs control panel. For example, when the heating system calls for heat, the spare contacts can close and turn on the modified tankless hot water heater 201. When the heating systems stops calling for heat, the spare contact will open and turn off the modified tankless hot water heater 201. The device can be sized to equal 110-125% of the home heating system's maximum Btu/h output.

In some embodiments, TEG 202 is a combination of four to nine 200 watt thermoelectric generators similar to those manufactured by Thermonamic Electronics Corp LTD (e.g., Model TEG200-48V). The combination of devices can be configured so that they do not exceed 80% of the HVACs electric power circuit capacity.

In some embodiments, the hot water coil 203 is a hot water coil placed in the return duct in the heating system (e.g., operating at 30 C), is a hot water coil in a single coil hot water tank, and/or the like. For a forced hot water heating system a hot water coil may not be necessary such that the TEG 202 is cooled by connecting the TEG cooling loop directly to the forced hot water loop.

In some embodiments, the emergency hot water coil and fan 204 is a supplemental hot water coil and fan. This device can be configured to operate in non-heating months when emergency power is needed. Electric power to operate the fan will come through the PCU 206.

In some embodiments, the backup battery inverter system 205 is a battery backup and inverter system configured to convert the TEG 102's DC output voltage to AC voltage for use in the residential power system.

In some embodiments, PCU 206 is a microprocessor or relays configured to control operation of the HVAC air handler system 209, the existing refrigerator 210 and the emergency lights 207. There can be four modes of operation: Mode 1, Heating season Utility power on; Mode 2, Heating season Utility power off; Mode 3, Non-heating season Utility power on; and Mode 4, Non-heating season Utility power off.

For example, in Mode 1 when the TEG is cycled on via the HVAC control panel the TEG will supply synchronized power to the HVAC circuit while the normal HVAC circuit remains closed. Any excess TEG power can flow back to the homes electric systems.

As another example, in Mode 2 when utility power is lost the TEG & batteries will back up the HVAC air handler, refrigerator and emergency lighting. The normal power circuit's contacts to both appliances can open and isolate the circuits from the homes main power panel.

As another example, in Mode 3 the PCU alternates the HVAC air handler and refrigerator during peak load hours of 11 am to 9 pm. In the event both appliances are calling for normal power the refrigerator can be switched to battery backup via a time delay relay (e.g., set at 0-30 minutes) until the HVAC system cycles off. The time delay relay can be overridden if the refrigerator is opened.

As another example, in Mode 4 the PCU turns on the TEG and supply backup power via the battery/inverter to the refrigerator and emergency lights. Under this exemplary scenario the cold side of the TEG's connect to device 204 not the hot water coil 203 or forced hot water loop in system 300. In some embodiments, the HVAC air handler may not be supplied emergency power in this mode. The normal power circuit's contacts to both appliances can open and isolate the circuits from the homes main power panel.

In some embodiments, emergency lights 207 consists of multiple direct current emergency lights placed throughout the residence. Emergency lights can come on when normal utility power fails.

In some embodiments, solar thermal system 208 is a solar thermal system which will preheat the oil in the tankless hot water system. (This is a supplemental system not necessary to operate CHP system.)

In some embodiments, the heat & AC air handler 209 is the existing home HVAC air handling system (e.g., for a forced hot water system, heating only). Device 210 can be the existing home refrigerator.

Figure 3:
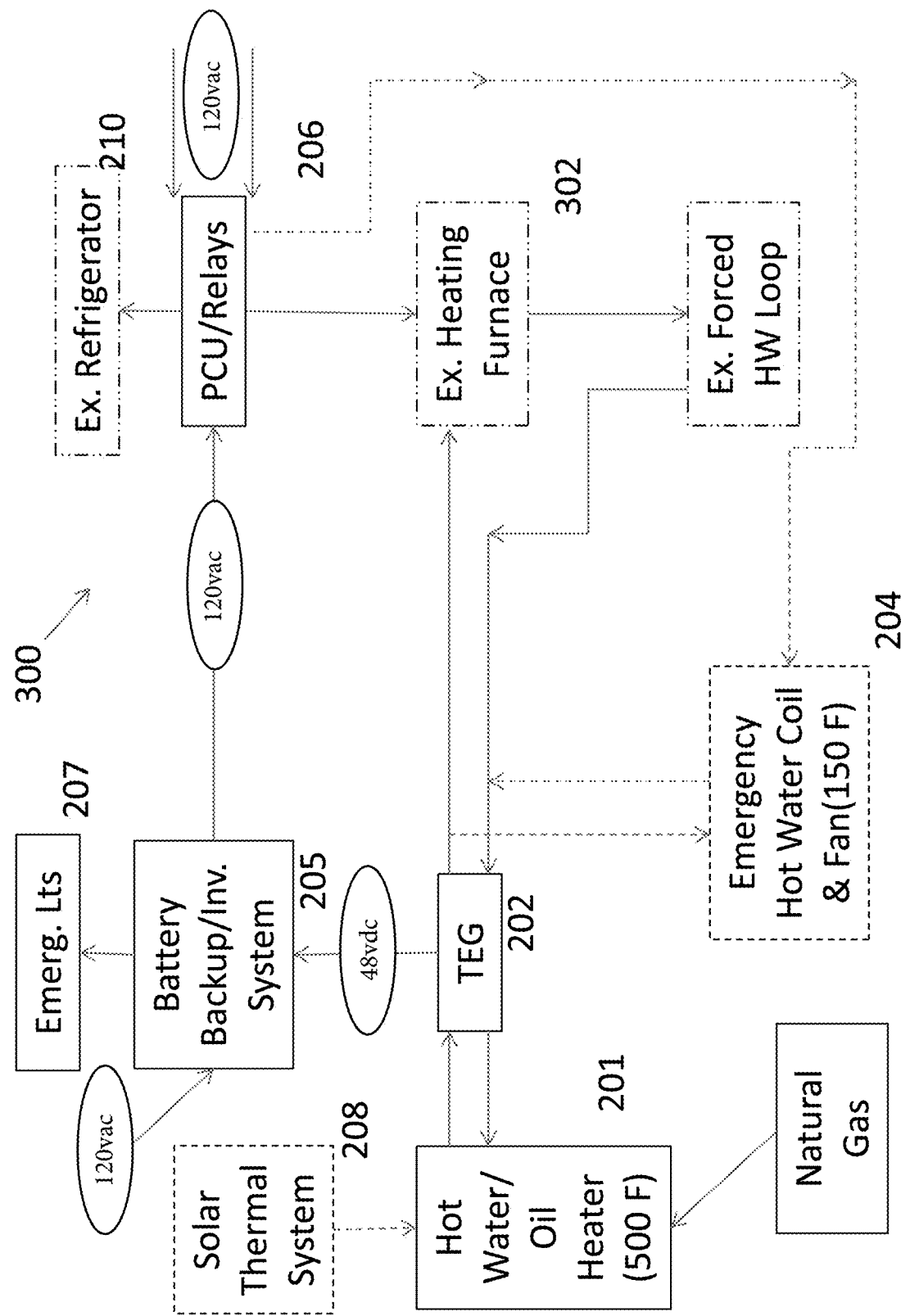
FIG. 3 is an exemplary diagram illustrating a residential combined heat and power system for use in a forced hot water heating system, in accordance with some embodiments.

FIG. 3 is an exemplary diagram illustrating a residential combined heat and power system 300 for use in a forced hot water heating system, in accordance with some embodiments. FIG. 3 illustrates similar components as those shown in FIG. 2 adapted for connection to a forced hot water home system rather than a forced hot air home system. The TEG's cold side loop(s) are connected directly to the forced heating system's hot water loop 302 (e.g., in lieu of through a hot water coil 203 in an air duct, as shown in FIG. 2).

System 100, 200 and 300 can be installed in, for example, residential homes with heating and cooling systems.

Figure 4:
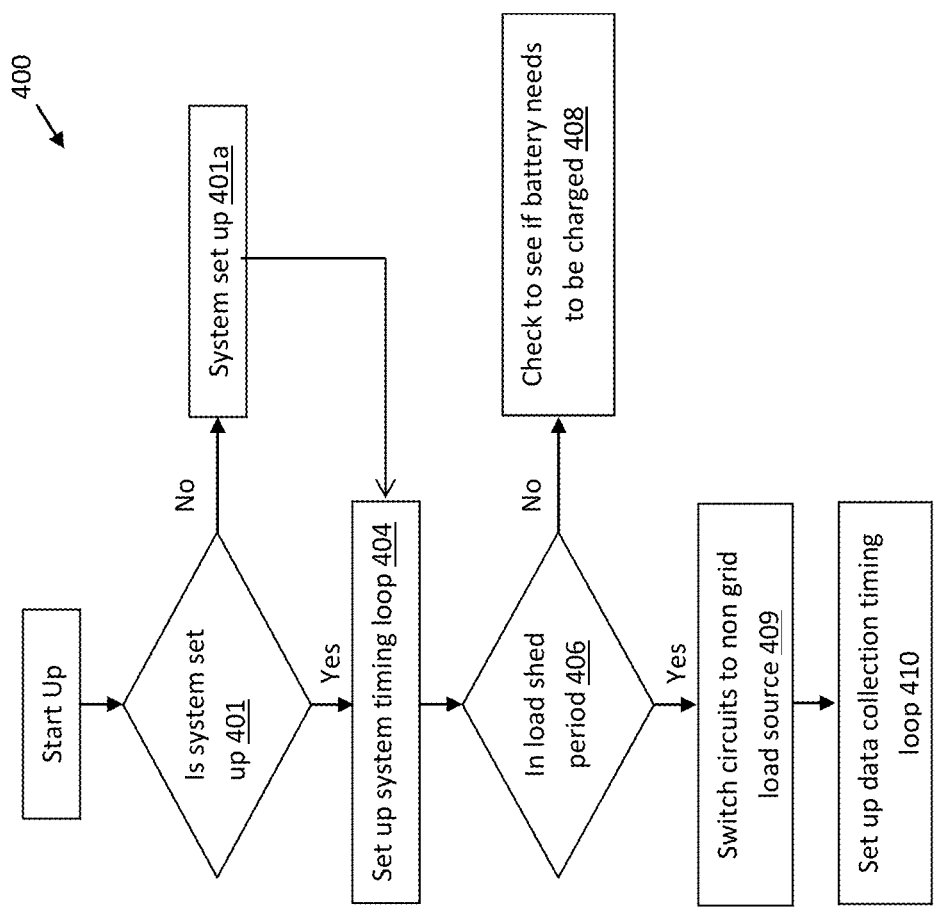
FIG. 4 is an exemplary flow chart illustrating a computerized process for load shifting, in accordance with some embodiments.

FIG. 4 is an exemplary flow chart illustrating a computerized process 400 for load shifting, in accordance with some embodiments. Referring to step 401, the device (e.g., the processor 103) checks to see if it has been set up yet, if not it performs a system setup. If not, the process 400 proceeds to step 401a and performs a set up. At step 404, the device sets the system timing loop. At step 406, the device checks to see if it is in a load shed period. At step 408, if the system is not in a load shed period (e.g., season) the system checks to see if the battery needs to be charged and charges the battery if necessary. At step 409, the device is in a load shed period and the device will switch the circuits to the off-grid power source. At step 410, the device sets up the data collection timing loop to read and store the electric usage data from device 107.

Referring to step 401, the system setup can include setting the current date and time, setting up communications with the power meter, and setting a device ID. The device can check to see if the current date is newer than last shutdown date of the system, and if not then the system detects a fault. The system setup can also include setting up input/output (I/O) modules and export needed GPIO pins. The I/O modules can be, for example, API (Application Programming Interface) modules that communicate with the GPIO pins (General-purpose input/output pins) which are generic pins on an integrated circuit whose behavior, including whether it is an used as an input or output pin, and can be controlled by the user at run time.

Referring to step 404, the device can set up a timing loop that starts a periodic routine. The timer can be set to any interval time period. For example, the routine can be performed every 60 minutes, so the timer can be set to 60 minutes. The device can check in with another device via internet or cell tower communications to let it know it is online. This routine can trigger the next step 406. While FIG. 4 only shows one iteration, one of skill in the art can appreciate that the steps in process 400 can be repeated for each predetermined interval.

Referring to step 406, the device can check the current date and time to determine if it is in a load shed period. For example, the load shed period can be from 1-5 pm during the summer and from 5-7 pm in the winter. The load shed period can be configured to other time periods, such as those set by a local electric power pool and utility.

Referring to step 408, the device has determined it is not in a load shed period and it will check the battery status and trigger the charging algorithm to determine if the battery needs charging at this time.

Referring to step 409, the device has determined it is in a load shed period and will switch one or more electric circuits (e.g., 109, 110, 111 from FIG. 1) to the off-grid power source (e.g., battery system 104 from FIG. 1).

Referring to step 410, the device can set up a timing loop to run a routine every interval set in step 404 (e.g., 60 seconds, or other time interval) to read the stored data in the meter (e.g., 107 in FIG. 1) and the readings can be stored locally on the device's storage media. The read data can also be transmitted to another storage device via, e.g., USB connection, Ethernet, WiFi, WLAN, LAN, Cell Tower, Internet, and/or the like. The device can also check to see if it is time to switch one or more electric circuits (e.g., 109, 110, 111 from FIG. 1) back to the grid power.

Figure 5:
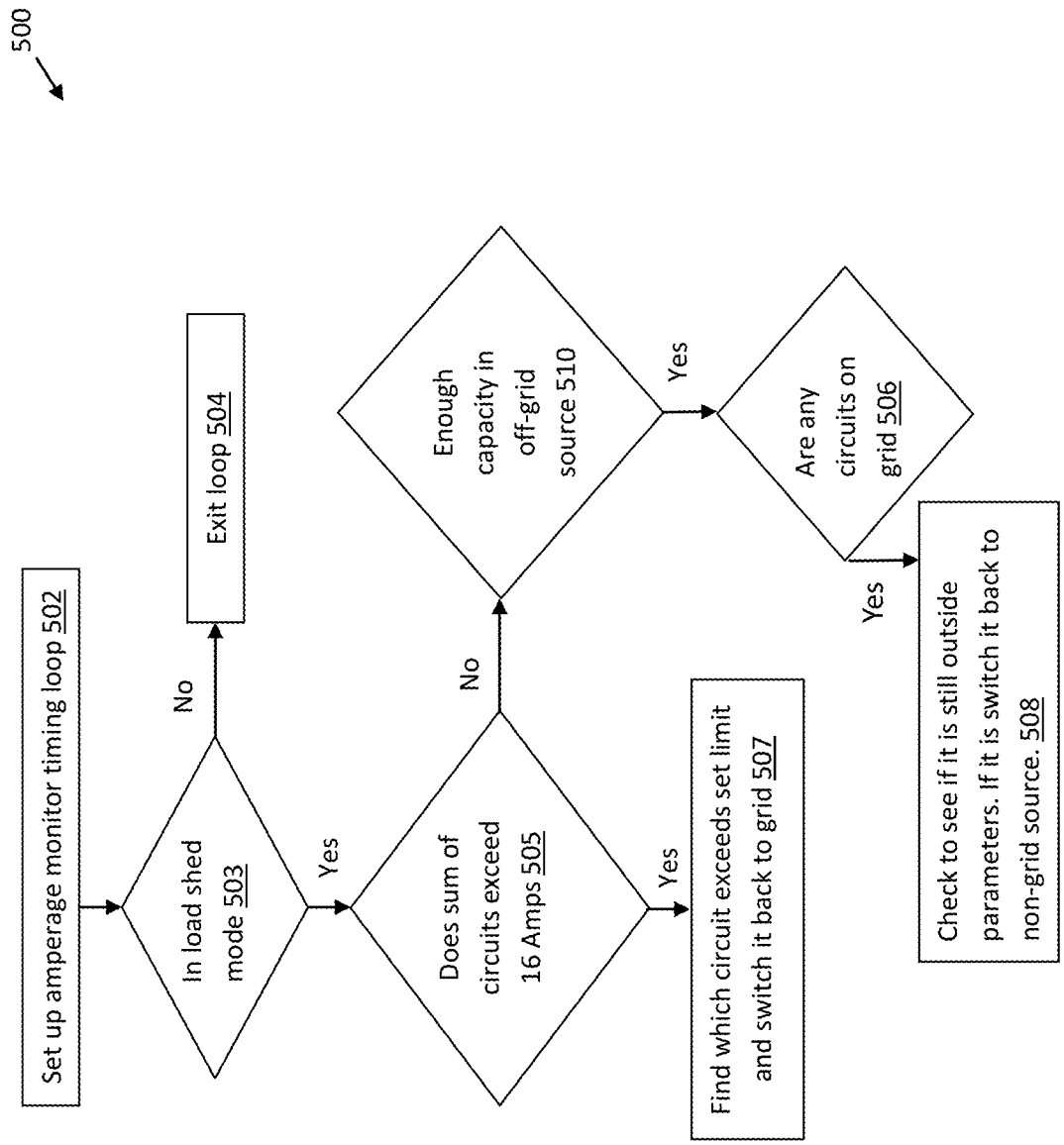
FIG. 5 is an exemplary flow chart illustrating a computerized process for load shifting in a shed period, in accordance with some embodiments.

FIG. 5 is an exemplary flow chart illustrating a computerized process 500 for load shifting in a shed period, in accordance with some embodiments. At step 502, the device (e.g., the processor 103) sets up a timing loop to monitor the amperage draw of the circuits on the off-grid power source 104. At step 503, the device checks to see if it is in the load shed mode, and if it is not it will move to step 504, and if it is in load shed mode, the device will move to step 505. At step 504, the device will exit the timing loop. At step 505, the device will determine the total amperage draw from the off-grid source 104. If the sum of the circuits does not exceed a predetermined threshold (e.g., 16 Amps), the process 500 proceeds to step 510. At step 510, the device can check to see the remaining time available from the off-grid power source will be sufficient to finish the Load Shed Period. If yes, the process 500 proceeds to step 506. At step 506, amperage is within limits so the system checks to see if any circuits are on grid source. At step 508, the system checks the amperage on the grid supplied circuit to determine if it can switch back to off-grid source. If the sum of the circuits exceeds the predetermined threshold at step 505, the process 500 proceeds to step 507. At step 507, the system finds the circuit exceeding its limit and switches it back to grid source.

Referring to step 502, the device will set up a timing loop routine that will at a predetermined timing interval (e.g., every 30 or 60 seconds) to start a routine to check the amperage draw, e.g., to keep the amperage draw in safe limits and to prolong the time the off-grid source will be available. While FIG. 5 only shows one iteration, one of skill in the art can appreciate that the steps in process 500 can be repeated for each predetermined interval.

Referring to step 503, the device will check to see if it is in a load shed period.

Referring to step 504, the device is not in a Load Shed Period and will exit the timing loop.

Referring to step 505, the device the check the sum of all circuits and determine if the amperage draw is exceeding the safe limit for the power panel 108.

Referring to step 507, the device will check each circuit to find which is exceeding their limit and will switch that circuit back to the power grid source.

Referring to step 510, the device can check the power source 104 status or remaining capacity to decide if any circuit(s) should be switched back to power grid source to lengthen the off-grid sources remaining time available. If there is enough capacity, the system does not switch back to power grid source (not shown).

Referring to step 506, the sum of the amperage was found to be within limits. The device will check to see if any circuits are on the power grid source, and if any circuits are on the power grid source the device will move onto step 508.

Referring to step 508, the system checks the amperage of each circuit. If the system determines a particular circuit's amperage is within limit, the circuit will be switched back to the off-grid source.

Figure 6:
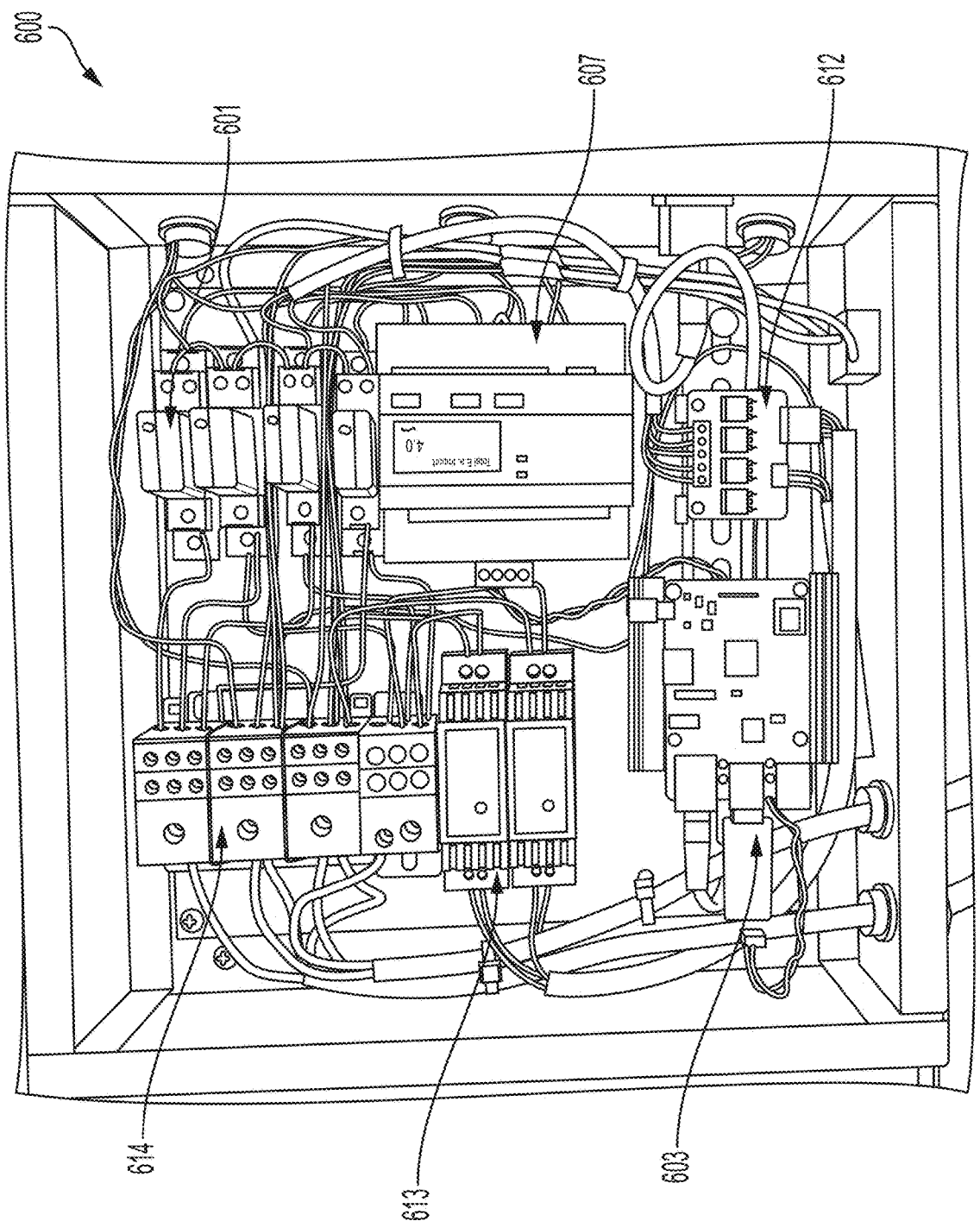
FIG. 6 is an exemplary diagram illustrating a load shifting energy storage system, in accordance with some embodiments.

FIG. 6 is an exemplary diagram illustrating a load shifting energy storage system 600, in accordance with some embodiments. Item 601 is a series of multiple relays to switch between utility and battery power. Item 603 is a microprocessor capable of switching a relay 601 from normal utility power to battery power based upon the local utility and power pool on and off peak power load shedding requirements. Item 607 is an electric meter and current transformer capable of recording hourly kilowatt-hours for reporting to the local power pool and utility company. Item 612 is a metal oxide semiconductor field effect transistor (MOSFET) used to supply power to and energize the relay coils. Item 613 is a power supply to supply power to the micro-processor and MOSFET. Item 614 is a wiring terminal block.

Figure 7:
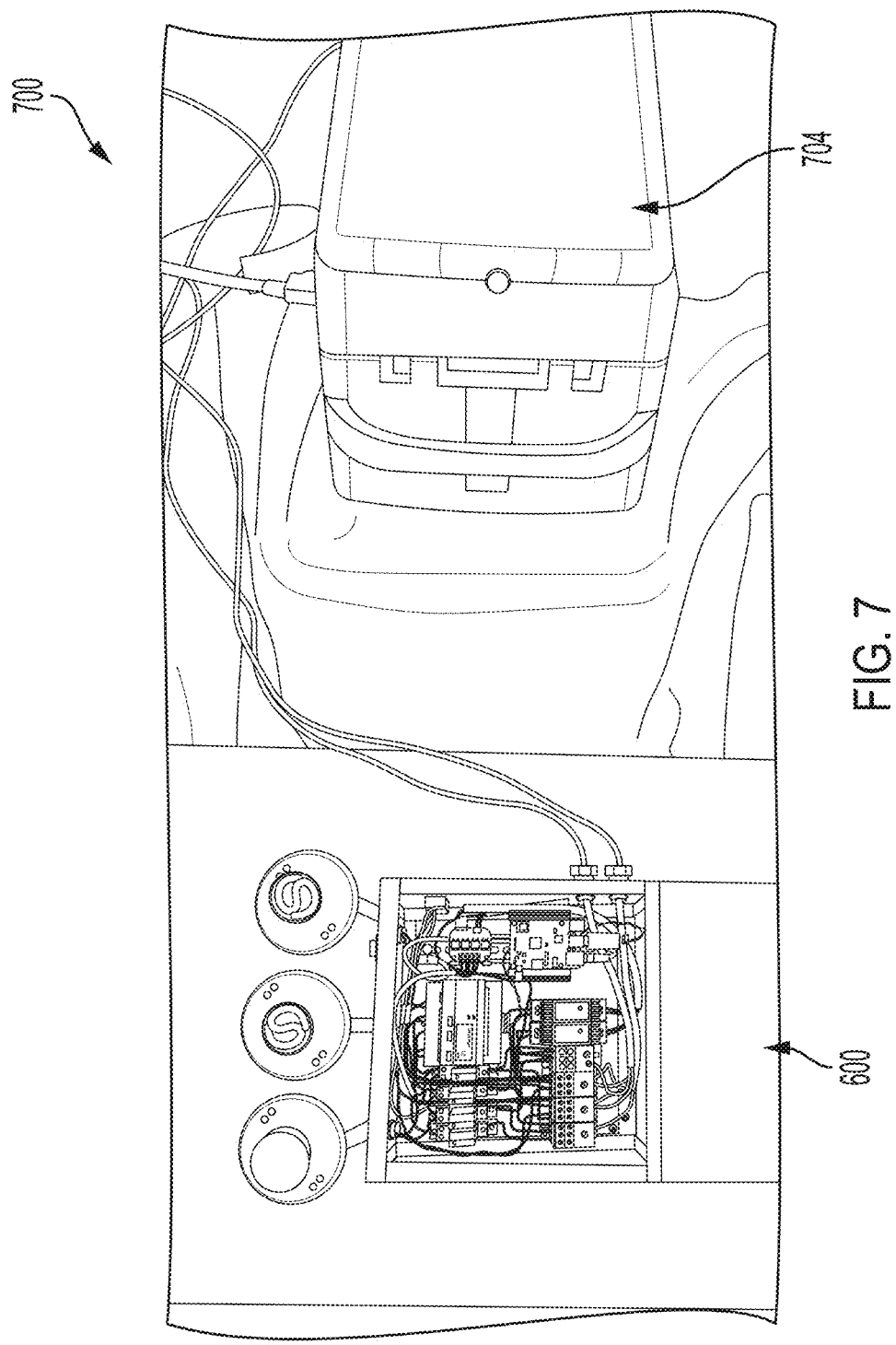
FIG. 7 is an exemplary diagram illustrating a load shifting energy storage system including a battery system, in accordance with some embodiments.

FIG. 7 is an exemplary diagram 700 illustrating a load shifting energy storage system 600 from FIG. 6 including a battery system 704, in accordance with some embodiments.

In some embodiments, the battery system 704 includes a battery charger that charges the battery during off peak hours as programmed in the microprocessor. In some embodiments, the battery system 704 includes a battery capable of supplying power to, for example, HVAC, Refrigerator, and/or a set of lights (e.g., kitchen lights) during on peak hours as programmed in the microprocessor. In some embodiments, the battery system 704 includes a dc to ac inverter to convert dc battery power to ac utility power.

The techniques provided herein can provide lower cost electric supply to end use customers, and can reduce $CO_2$ emissions from large power plants through greater efficiencies and load shifting during peak load hours, compared to existing heating and cooling systems.

The techniques provided herein can reduce 330 kg of $CO_2$ per year per household, which is equivalent to removing 1/10 of a car from the road per year. Scaling to the entire US, there are 126 million residential electric users in the US, half of which have heating and cooling systems; 10 homes will remove the equivalent of 1 car/yr., one million homes will remove 100,000 cars/yr., 60 million homes will remove 6 million cars, or 19.8 million tons of $CO_2$ each year.

The techniques provided herein can provide emergency power for a household heating, refrigerator, emergency lights, and/or other household utilities.

The techniques provided herein can reduce electric and natural gas utility company distribution, transmission, gas pipeline expansion needs, and/or the like, saving consumers billions on regulated utility costs.

The techniques provided herein can provide lower cost electric supply to end use customers and reduce $CO_2$ emissions from large power plants through load shifting during peak load hours.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A load shed apparatus for shifting a residential electric load from a utility power grid to a battery system during preconfigured hours of electric use, the load shed apparatus comprising:
  a first connection configured to electrically connect to a power panel of the residential property;
  a second connection configured to electrically connect to the battery system;
  a limited set of electric circuits, wherein:
    the limited set of electric circuits is less than a total set of electric circuits in the residential property; and
    each of the electric circuits comprises an associated relay so that each electric circuit can be individually controlled to be in electrical communication with the first connection to the power panel or the second connection to the battery system, such that each electric circuit can individually receive electricity from either the utility power grid or the battery system via the load shed apparatus;
  a memory configured to store computer executable instructions; and
  a microprocessor in communication with the memory and each relay of the electric circuits in the limited set of electric circuits, the microprocessor configured to execute the instructions to cause the load shed apparatus to:
    individually shift residential electric load for each electric circuit of the limited set of electric circuits for a first time period during a first calendar period of a calendar year, comprising:

individually shifting each associated relay of a first group of one or more electric circuits from the limited set of electric circuits so that each electric circuit of the first group shifts from receiving power from the utility power grid to receiving power from the battery system for the first time period; and intermittently cycling, during the first time period, each individual electric circuit of a second group of one or more electric circuits of the limited set of electronic circuits by cycling each associated relay of the electric circuits of the second group so that each electric circuit of the second group cycles between (a) receiving power from the utility power grid and (b) an off position wherein the second group of one or more electric circuits does not receive power, wherein the first group of one or more electric circuits is different than the second group of one or more circuits; and shift residential electric load for a second time period during a second calendar period of the calendar year, comprising:

individually shifting each of the associated relays of the electric circuits of the first group of one or more electric circuits so that each electric circuit of the first group shifts from receiving power from the utility power grid to receiving power from the battery system for the second time period; and intermittently cycling, during the second time period, each individual electric circuit of the second group of one or more electric circuits by cycling each of the associated relays of the electric circuits of the second group so that each electric circuit of the second group cycles between (a) receiving power from the utility power grid and (b) the off position.

2. The load shed apparatus of claim 1, wherein the first time period, the second time period, the first calendar period, and the second calendar period are defined by a local electric power pool and utility.

3. The load shed apparatus of claim 2, wherein:
the first time period is 1-5 pm and the first calendar period is a summer season; and
the second time period is 5-7 pm and the second calendar period is a winter season.

4. The load shed apparatus in claim 1, wherein each relay of the limited set of electric circuits are 20 amp relays, and the microprocessor is configured to control the 20 amp relays via a MOSFET.

5. The load shed apparatus in claim 1, wherein:
a first electric circuit of the limited set of electric circuits is in electrical communication with a residence heating system, a second electric circuit of the limited set of electric circuits is in electrical communication with a refrigerator, and a third electric circuit of the limited set of electric circuits is in electrical communication with and kitchen lights; and
the microprocessor is further configured to automatically provide emergency power for one or more of the residence heating system, the refrigerator and the kitchen lights, for an emergency time period in the event of a loss of utility power.

6. The load shed apparatus in claim 5, wherein the emergency time period is 4-8 hours depending on a size of the battery system.

7. The load shed apparatus in claim 1, further configured to meter electric usage during shed and non-shed operations to generate reporting data.

8. The load shed apparatus in claim 7, further configured to:
meter the electric usage every minute individually for each of three electric circuits of the limited set of electrical circuits, wherein the three electric circuits supply power to a home HVAC system, a home refrigerator and home kitchen lights; and
sum the minute readings for each of the three individual circuits for each hour to generate hourly reporting data.

9. The load shed apparatus in claim 1, further configured to monitor the battery system for voltage, heat and hours of operation.

10. The load shed apparatus in claim 1, further comprising Ethernet circuitry to provide Ethernet communication to transmit reporting data to a remote server.

11. The load shed apparatus of claim 1, wherein the microprocessor is further configured to execute the instructions to cause the apparatus to shift residential electric load back to the utility power grid at a particular time.

12. The load shed apparatus of claim 1, wherein the microprocessor is configured to charge the battery using the electric grid or a solar system.

13. The load shed apparatus of claim 1, further comprising:
a thermal electric generator coupled to a heater and a home heating system of the residential property; and
the microprocessor is further configured to execute the instructions to cause the apparatus to charge the battery system using the thermal electric generator.

14. A load shed apparatus for shifting a residential electric load from a utility power grid to a battery system during preconfigured hours of electric use, the load shed apparatus comprising:
a first connection configured to electrically connect to a residential power panel of the residential property;
a second connection configured to electrically connect to the battery system;
a limited set of electric circuits, wherein:
the limited set of electric circuits is less than a total set of electric circuits in the residential property; and
each of the electric circuits comprises an associated relay so that each electric circuit can be individually controlled to be in electrical communication with the first connection to the power panel or the second connection to the battery system, such that each electric circuit can individually receive electricity from either the utility power grid or the battery system via the load shed apparatus;
a memory configured to store computer executable instructions; and
a microprocessor in communication with the memory and each relay of the electric circuits in the limited set of electric circuits, the microprocessor configured to execute the instructions to cause the load shed apparatus to:
individually control each relay of a first group of one or more electric circuits of the limited set of electric circuits to shift the electric load for the first group of one or more electric circuits, comprising individually shifting each associated relay of the first group of one or more electric circuits so that each electric circuit of the first group shifts from receiving power from the power panel to receiving power from the battery system for a time period during a calendar period of the calendar year;

intermittently cycling, during the time period, each individual electric circuit of a second group of one or more electric circuits of the limited set of electric circuits by cycling each associated relay of the electric circuits of the second group so that each electric circuit of the second group cycles between (a) receiving power from the power panel and (b) an off position wherein the second group of one or more electric circuits does not receive power, wherein the first group of one or more electric circuits is different than the second group of one or more circuits; and control each relay of the limited set of circuits to provide emergency power from the battery system for an emergency time period in the event of a loss of utility power to the power panel.

15. The load shed apparatus of claim 14, wherein the microprocessor is configured to charge the battery using the electric grid or a solar system.

16. The load shed apparatus of claim 14, further comprising:

a thermal electric generator coupled to a heater and a home heating system of the residential property; and the microprocessor is further configured to execute the instructions to cause the apparatus to charge the battery system using the thermal electric generator.

17. The load shed apparatus in claim 14, wherein each relay of the limited set of electric circuits are 20 amp relays, and the microprocessor is configured to control the 20 amp relays via a MOSFET.

* * * * *